United States Patent
Kim et al.

(10) Patent No.: US 10,540,826 B2
(45) Date of Patent: Jan. 21, 2020

(54) METHOD OF PLAYING VIRTUAL REALITY IMAGE AND PROGRAM USING THE SAME

(71) Applicant: CLICKED INC., Seoul (KR)

(72) Inventors: Tae Wook Kim, Seoul (KR); Ha Ram Lee, Seoul (KR); Duk Young Jung, Seoul (KR)

(73) Assignee: CLICKED INC., Seoul (KR)

( * ) Notice: Subject to any disclaimer, the term of this patent is extended or adjusted under 35 U.S.C. 154(b) by 0 days.

(21) Appl. No.: 16/122,357

(22) Filed: Sep. 5, 2018

(65) Prior Publication Data

US 2019/0005738 A1    Jan. 3, 2019

Related U.S. Application Data

(63) Continuation of application No. PCT/KR2018/002398, filed on Feb. 27, 2018.

(30) Foreign Application Priority Data

Mar. 3, 2017 (KR) .......................... 10-2017-0027851

(51) Int. Cl.
*G06T 19/20* (2011.01)
*G06F 3/01* (2006.01)

(52) U.S. Cl.
CPC .............. *G06T 19/20* (2013.01); *G06F 3/012* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 9,271,025 B2* | 2/2016 | McArdle | H04N 21/23412 |
| 2015/0091943 A1* | 4/2015 | Lee | G02B 27/0172 |
| | | | 345/633 |
| 2016/0342204 A1* | 11/2016 | Cho | G06F 3/011 |

FOREIGN PATENT DOCUMENTS

| | | |
|---|---|---|
| CN | 105389001 A | 3/2016 |
| CN | 106131539 A | 11/2016 |
| GB | 2 512 404 A | 10/2014 |
| JP | 2012-048597 A | 3/2012 |
| KR | 10-2009-0065914 A | 6/2009 |
| KR | 10-2014-0010616 A | 1/2014 |
| KR | 10-2016-0125708 A | 11/2016 |

OTHER PUBLICATIONS

"Making UI", UI Programming, Jul. 7, 2016, No. 7, Online post, URL: <http://dwschool21.cafe24.com/bbs/board.php?oo_table=B61&wr_id=18>.
International Search Report issued in PCT/KR2018/002398; dated Jun. 7, 2018.

(Continued)

*Primary Examiner* — Said Broome
(74) *Attorney, Agent, or Firm* — Studebaker & Brackett PC

(57) ABSTRACT

Disclosed is a method of playing a virtual reality image, and the method includes receiving, by a client, an image frame from a server, allocating the received image frame to a first layer, generating a second layer including at least one graphic user interface, composing the first layer and the second layer to generate a final image frame, and displaying the generated final image frame.

10 Claims, 11 Drawing Sheets

(56) References Cited

OTHER PUBLICATIONS

An Office Action mailed by the Ministry of Economic Affairs Intellectual Property Office dated Jan. 14, 2019, which corresponds to Taiwanese Patent Application No. 107106869 and is related to U.S. Appl. No. 16/122,357.
The extended European search report issued by the European Patent Office dated Apr. 2, 2019, which corresponds to European Patent Application No. 18759015.3-1224 and is related to U.S. Appl. No. 16/122,357.
Michael Antonov, "Asynchronous Timewarp Examined", Mar. 3, 2015, pp. 1-11, XP055344740, URL:https://developer3.oculus.com/blog/asynchronous-timewarp-examined/.

* cited by examiner

Normal

First final image frame

First time point

Second final image frame

Second time point

Third final image frame

Third time point

METHOD OF PLAYING VIRTUAL REALITY IMAGE AND PROGRAM USING THE SAME

CROSS-REFERENCE TO RELATED APPLICATIONS

The present application is a continuation of International Patent Application No. PCT/KR2018/002398, filed on Feb. 27, 2018, which is based upon and claims the benefit of priority to Korean Patent Application No. 10-2017-0027851, filed on Mar. 3, 2017. The disclosures of the above-listed applications are hereby incorporated by reference herein in their entirety.

BACKGROUND

Embodiments of the inventive concept described herein relate to a Virtual Reality (VR) image transmitting method, a VR image playing method, and a program using the same, and more particularly, relate to a method or program for transmitting and playing virtual reality content, which requires a high specification over network communication, in real time.

Virtual Reality (VR) is a space that gives reality through three-dimensional visual effects, as a virtual space created by a computer. The technology for implementing the VR is a next generation technology that goes beyond multimedia, as a technology that can process a user input in real time to provide a user with the feeling of being in the real world.

A VR environment not only allows the user to simulate real objects but also allows the user to experience objects or situations that do not actually exist, by providing the user with realistic immersion. The VR environment may be applied to various fields. For example, the VR environment is used in a variety of fields ranging from an engineering field (e.g., an automobile design, a simulation experiment, or the like) to a medical field or a cultural content field.

In terms of view, the VR is mixed with terms such as virtual environment, virtual presence, artificial world, virtual world, and cyber space. However, the VR generally provides the user with a three-dimensional virtual world, which is similar to the real world and which is created by the computer, and provides the user with an input means capable of freely operating the virtual world in real time and a sensory feedback means for providing an actual sensation in response to the manipulation of the user, and thus the VR is a technology that enables artificial experience.

Nowadays, with the advance in technology, there are many devices capable of using VR content. In the past, while a VR playing device was connected to a personal computer (PC) such as a desktop computer or the like, a user wearing the VR playing device utilizes the VR playing device for the purpose of generating a high-end VR image. However, in this case, the action radius in which the user moves while wearing the VR device is limited by a cable, the user may fall over the cable in a state where the user cannot recognize the outside because the user wears a VR device. Also, only when the user has a PC, the user may enjoy a VR image by using the VR device.

In addition, a method in which a mobile device processes information for generating a VR image to transmit the processed information to a VR device while the mobile terminal is combined with the VR device has been recently emerging. The VR device for playback is connected, by wired, to the mobile terminal being a computer that processes information. However, since the mobile terminal is coupled to the VR device, the problem occurring due to the cable may be solved. However, since it is difficult for the mobile terminal to drive a high-end program compared with a PC, it is difficult to drive a high-end VR game or to play a high-resolution VR image.

The technical problems to be solved by the present inventive concept are not limited to the aforementioned problems, and any other technical problems not mentioned herein will be clearly understood from the following description by those skilled in the art to which the inventive concept pertains.

SUMMARY

Embodiments of the inventive concept provide a VR image transmitting method, a VR image playing method, and a program using the same that can receive a VR image from a high-end computer regardless of a place and an action radius, by transmitting an image frame between an information processing device and a VR device over network communication to play the image frame.

According to an aspect of an embodiment, a method of playing a virtual reality image includes receiving, by a client, an image frame from a server, allocating the received image frame to a first layer, generating a second layer including at least one graphic user interface, composing the first layer and the second layer to generate a final image frame, and displaying the generated final image frame.

According to another aspect of an embodiment, the method further includes generating a third layer for displaying control information of at least one controller. The generating of the final image frame includes composing the first layer, the second layer, and the third layer to generate the final image frame.

According to another aspect of an embodiment, the generating of the third layer frame includes receiving, by the client, operation information of the at least one controller, generating an image indicating the control information of the at least one controller, by using the received operation information, and allocating the generated image to the third layer.

According to another aspect of an embodiment, the receiving of the image frame includes receiving, by the client, a first image frame corresponding to a first time point from the server. The method further includes obtaining playback direction data and image direction data, which correspond to the first time point. The playback direction data is data associated with a direction of the image frame to be played on a screen of the client at a specific time point, and the image direction data is data associated with a direction on a three-dimensional space of the image frame generated by the server.

According to another aspect of an embodiment, the obtaining of the playback direction data includes measuring movement of a user's head to obtain the playback direction data.

According to another aspect of an embodiment, the receiving of the image frame further includes calculating a difference value between the image direction data at the first time point and the playback direction data at the second time point to correct the first image frame based on the difference value, when an image frame at a second time point is not received. The second time point is a time point at which a transmission period of the image frame elapses from the first time point.

According to another aspect of an embodiment, the correcting of the first image frame includes moving or converting the first image frame based on the difference value to generate a second alternative image frame. The allocating of the received image frame to the first layer includes allocating the generated second alternative image frame to the first layer.

According to another aspect of an embodiment, the playback direction data and the image direction data include data of angle of elevation and azimuth data, and the calculating of the difference value includes calculating a difference in angle of elevation and azimuth between the image direction data at the first time point and the playback direction data at the second time point.

According to another aspect of an embodiment, the playback direction data and the image direction data include tilt data, which is an angle of rotation about a frontal direction of a user. The correcting of the first image frame further includes rotating and correcting the first image frame based on a difference in the tilt data between the playback direction data at the second time point and the image direction data at the first time point.

According to another aspect of an embodiment, the method further includes comparing the image direction data corresponding to a (n−1)-th time point with the playback direction data corresponding to a n-th time point to calculate the difference value, when the image frame corresponding to the n-th time point ('n' is a natural number greater than '2') is not received and correcting a (n−1)-th alternative image frame by the calculated difference value to generate a n-th alternative image frame. The n-th time point is a time point at which the transmission period of the image frame elapses from the (n−1)-th time point, as a time point at which a n-th image frame is received.

According to another aspect of an embodiment, a virtual reality image playing program is coupled to a computer being hardware and is stored in media to perform a VR image playing method.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
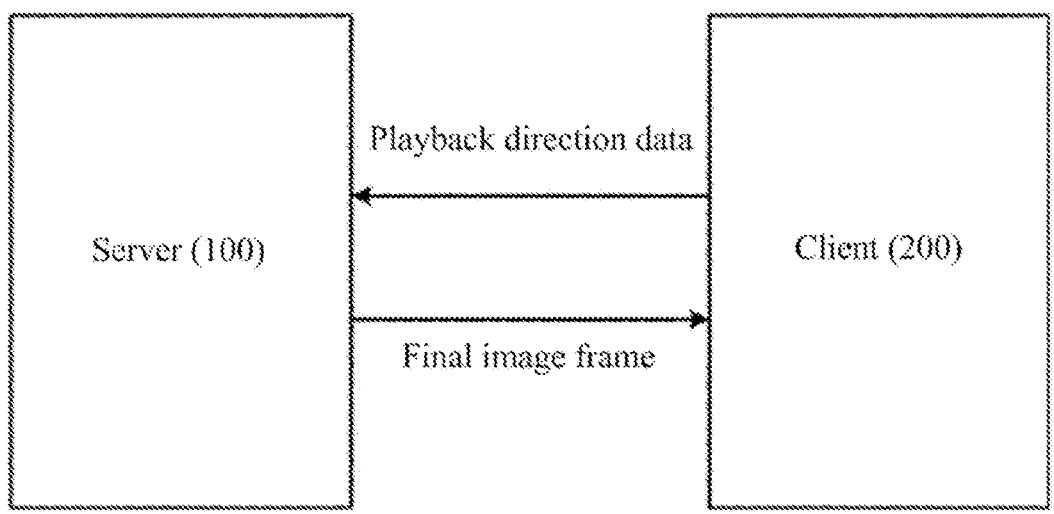
FIG. 1 is a block diagram of a VR image transmitting/receiving system, according to an embodiment of the inventive concept.

Below, embodiments of the inventive concept will be described in detail with reference to accompanying drawings. Advantage points and features of the disclosure and a method of accomplishing thereof will become apparent from the following description with reference to the following figures, wherein embodiments will be described in detail with reference to the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the concept of the inventive concept to those skilled in the art. The inventive concept may be defined by scope of the claims. Meanwhile, the terminology used herein to describe embodiments of the invention is not intended to limit the scope of the invention. Like reference numerals refer to like elements throughout.

Unless otherwise defined, all terms including technical and scientific terms used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terminology used herein is for the purpose of describing embodiments and is not intended to limit the invention. As used herein, the singular terms "a," "an" and "the" are intended to include the plural forms as well, unless the context clearly indicates otherwise. The terms "comprises" and/or "comprising" used herein does not exclude presence or addition of one or more other elements, in addition to the aforementioned elements.

Hereinafter, a VR image transmitting/receiving system according to an embodiment of the inventive concept will be described with reference to drawings.

FIG. 1 is a block diagram of a VR image transmitting/receiving system, according to an embodiment of the inventive concept.

The VR image transmitting/receiving system according to an embodiment of the inventive concept includes a server 100 and a client 200.

The server 100 is a computer generating a VR image. The server 100 processes information therein to generate the VR image to be provided to the client 200. For example, when the VR image is an image according to the operation of a specific game, the server 100 may drive a game program, may generate a proper image frame, and may transmit the image frame to the client 200 over network communication (ex. wireless communication).

In addition, the server 100 may combine the generated VR image with image direction data as Meta information. The image direction data may be data associated with the direction on the three-dimensional space of the image frame generated by the server 100.

Furthermore, the server 100 may receive playback direction data from the client 200. The server 100 may determine that image direction data to be combined with the image frame is the received playback direction data, and may generate a VR image frame corresponding to the playback direction data (or the image direction data).

The client 200 is a device that receives and plays an image frame (i.e., the final image frame to be described below) corresponding to the VR image. That is, the client 200 may play the VR image frame received from the server 100 to provide a wearer. The client 200 may correspond to the VR device itself and may correspond to a form in which a mobile terminal is coupled to the VR device. For example, when the VR device and the mobile terminal are coupled to form the client 200, the mobile terminal may receive the image frame generated from the server 100 and may transmit the image frame to the VR device through the connected wired cable or the connected short range wireless communication to display the image frame on a screen.

The VR device may be configured in various forms. For example, the VR device displays an image frame including each of images suitable for both eyes on one display device and may generate the image frame being a three-dimensional image by using a fisheye lens in each eye direction. In addition, in another embodiment, the VR device may have two display devices each of which provides an image matched with each eye.

Furthermore, the client 200 may measure the playback direction data. The playback direction data may be data associated with the direction of an image frame to be played on the screen of the client 200 at a specific point in time. That is, a wearer may measure the direction in which the wearer is looking while wearing the client 200 on his/her eyes and may determine that the direction is the playback direction data. For example, the playback direction data may include data of angle of elevation, azimuth data, or tilt data. The client 200 may include one or more sensors (e.g., a gyro sensor, an acceleration sensor, a geomagnetic sensor, and the like); and the client 200 may measure the movement of the head (or the neck) of the user wearing the client 200 to include data of angle of elevation, azimuth data, tilt data, and the like. Moreover, the client 200 may transmit the measured playback direction data to the server 100 over network communication.

The data of angle of elevation may mean an angle between the horizontal plane (e.g., the horizon) and the sight direction of the client 200. That is, the data of angle of elevation may be an angle with the horizontal plane, which is changed depending on the up and down movement of the user's head.

The azimuth data may be an angle indicating azimuth, and may mean the angle of rotation about a specific reference direction on a horizontal plane. In other words, the azimuth data may be changed by rotating the user's body (or neck).

The tilt data may mean an angle at which the head rotates about the user's frontal direction. In other words, the tilt data may be changed by moving the user's head to the right or left or by rotating the user's body.

Also, the client 200 may measure the movement of the wearer. For example, when performing virtual simulation training or game, since the user moves while wearing the client 200, the client 200 may make a request for an image frame, which is matched with the moved location based on the degree of the user's movement, to the server 100. In addition, as described below, when an image frame at a specific time point at which the user moves is not received, the client 200 may correct the image frame by reflecting the degree of the user's movement between image frame transmission periods.

Furthermore, when a specific image frame is not received in the case where the client 200 receives an image frame over network communication, the client 200 may correct the previously received image frame so as to be suitable for the user's movement and then may display the corrected image frame on a screen. That is, when the final image frame at a second time point is not received, the client 200 may calculate a difference value between image direction data at the first time point and playback direction data at the second time point, and then may correct the final image frame at the first time point, based on the difference value. The second time point may be a time point at which the transmission period of the final image frame has elapsed from the first time point.

The server 100 and the client 200 may be connected over wireless communication. A Wi-Fi method, cellular communication, and the like may be used as a wireless communication method. For example, when the server 100 is a computer located in a specific space (e.g., the inside of a house, the inside of the VR experience space) where the user is located, the client 200 and the server 100 may communicate with each other through a wireless AP (e.g., Wi-Fi AP). Furthermore, for example, when the server 100 is a computer located at a long distance, the server 100 located at a long distance may transmit the generated image frame to the client 200 over cellular communication, LAN communication, or the like. The client 200 may receive the image frame from a base station via cellular communication or may receive the image frame from a wireless AP through a WLAN. As such, when the user has the client 200, wireless communication of which is possible, the user may receive and utilize the VR image provided from the server 100 even though the user is not located near the server 100.

Hereinafter, according to an embodiment of the inventive concept, a VR image transmitting method, a VR image playing method and a program using the same will be described with reference to drawings.

When the VR image is transmitted over network communication, since the state of a network is not good, a specific image frame may be missed. In this case, a wearer feels that the object in the image frame is shaking, and thus the wearer feels motion sickness. To solve this problem, there is a need to generate an alternative image frame with which the missing image frame is to be replaced, from the image frame received at the previous time point and to provide the user with the alternative image frame.

Since an existing method in which the server 100 and the client 200 are connected by wired via a cable is also performed by the computer of the server 100 generating an image corrects an image, there is no need for a separate criteria for correction. However, a method of transmitting an image frame between the server 100 and the client 200 over network communication is divided into an operation in which the server 100 generates an image frame and an operation in which the client 200 supplements a missing image frame at a specific time point, and thus there is a need for an criteria for correction. Accordingly, hereinafter, the VR image generating and transmitting method of the server 100 and the VR image playing method of the client 200 will be described to prevent the user from recognizing the inconvenience of image shaking by supplementing an image frame not received over network communication.

Figure 2:
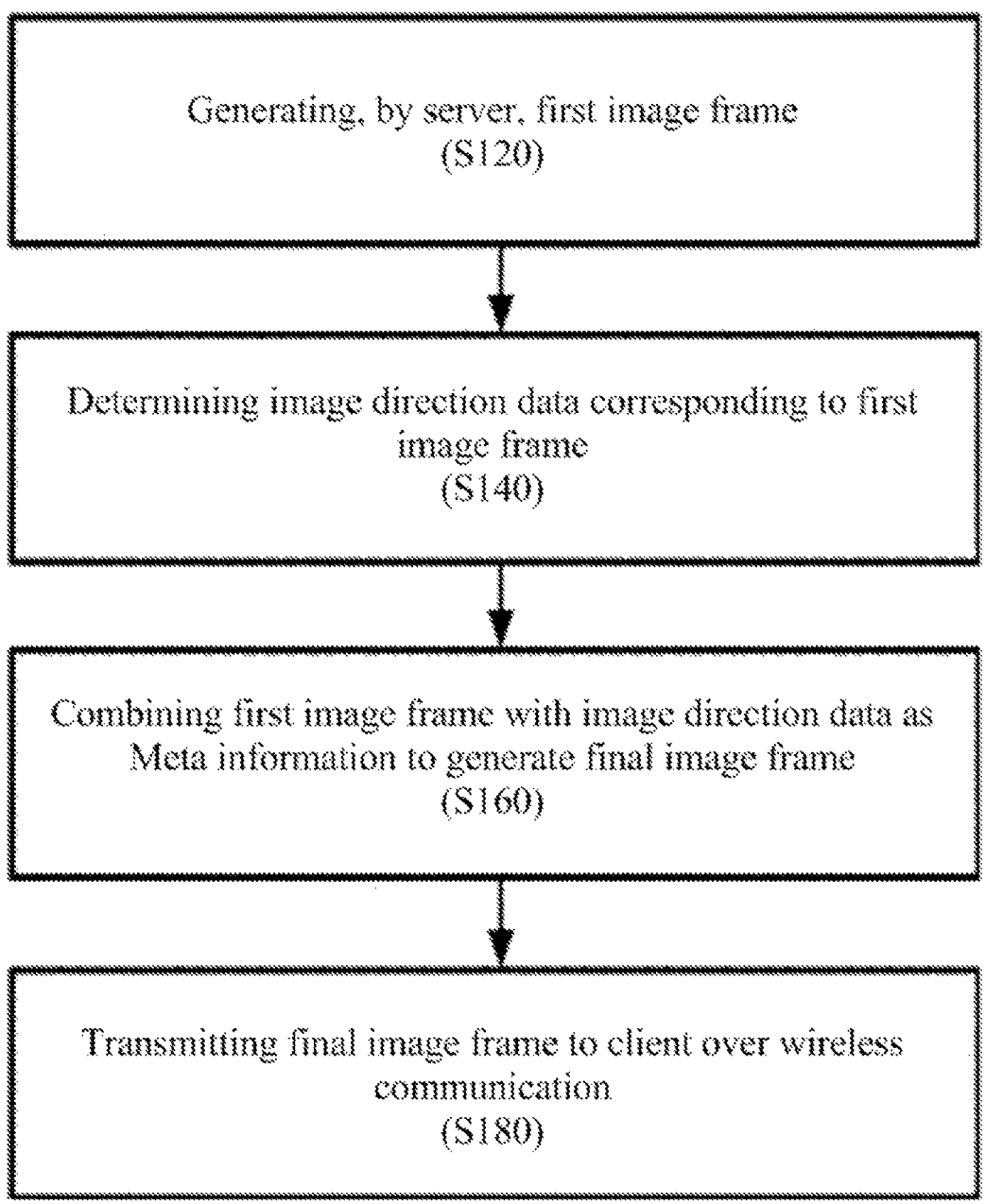
FIG. 2 is a flowchart of a method of transmitting a VR image, according to an embodiment of the inventive concept.

FIG. 2 is a flowchart of a method of transmitting a VR image, according to an embodiment of the inventive concept.

Referring to FIG. 2, a VR image transmitting method according to an embodiment of the inventive concept may include operation S120 in which the server 100 generates a first image frame, operation S140 of determining image direction data corresponding to the first image frame, operation S160 of combining the first image frame with the image direction data as Meta information to generate a final image frame, and operation S180 of transmitting the final image frame to the client 200 over network communication.

In operation S120, the server 100 generates a first image frame. The server 100 may generate the first image frame by running an internally installed program. The first image frame means an image frame, in which information for supplement is not processed when a specific image frame is not received after being transmitted to the client 200. For example, the server 100 may drive a game program to generate a game image frame.

In operation S140, the server 100 determines image direction data corresponding to the first image frame. The image direction data is data associated with the direction on the three-dimensional space of the image frame generated by the server 100. The image direction data may be determined (e.g., the corresponding first image frame is generated after the direction of an image to be generated is determined when the provision of the image in a specific direction is requested) before an image is generated by the server 100, or the corresponding image direction data may be determined after an image frame is generated.

In operation S160, the server 100 may combine the first image frame with the image direction data as Meta information to generate the final image frame. Afterwards, in operation S180, the server 100 transmits the final image frame to the client 200 over network communication. That is, the server 100 may transmit, to the client 200, the final image frame obtained by combining the first image frame with image direction data such that the client 200 determines a direction corresponding to an image frame or supplements an image frame at the previous time point (i.e., a first time point) through correcting the image frame when the image frame is not received at the next transmission time point (i.e., a second time point).

When the final image frame at the second time point is not received from the server 100 due to a poor communication state or the like, the client 200 may calculate a difference value between image direction data at the first time point and playback direction data at the second time point, and then may correct the final image frame at the first time point, based on the difference value. The second time point may be a time point at which the transmission period of the final image frame has elapsed from the first time point.

Furthermore, the VR image transmitting method may further include operation S110 of receiving playback direction data from the client 200. For example, when a wearer moves while wearing the client 200, the client 200 may obtain data (e.g., data associated with the movement of the user's neck) associated with the direction of an image frame to be provided to a user through a screen at a specific time point, and then may transmit the data to the server 100. The data measured by the client 200 is referred to as "playback direction data", in operation S120 of determining the image direction data, the server 100 may determine the image direction data based on the playback direction data received from the client 200. That is, the server 100 may determine that the direction the same as the playback direction data received from the client 200 is a direction in which an image is to be generated. Accordingly, the server 100 may set the playback direction data received from the client 200 to image direction data in operation S120, and may generate a first image frame, which is matched with the set image direction data, in operation S100.

Furthermore, operation S140 of generating the final image frame may further include converting the final image frame into an image frame for each eye. There is a need for a difference between an image for the left eye and an image for the right eye such that a three-dimensional image is provided. Accordingly, the server 100 may generate the final image frame, which is to be transmitted to the client 200, as a final image frame for the left eye and a final image frame for the right eye.

Furthermore, operation S140 of generating the final image frame may further include an operation of converting the size of the final image frame to the size suitable for the screen of the client 200. That is, the server 100 may convert the size of an image frame so as to be suitable for the screen size of the client 200 such that the client 200 receives the final image frame and then plays the final image frame at once. As such, it is possible to minimize the time delay that may occur in the process of converting the size of the final image frame so as to be suitable for the screen size of the client 200, which has a specification lower than the server 100, for information processing.

Figure 3:
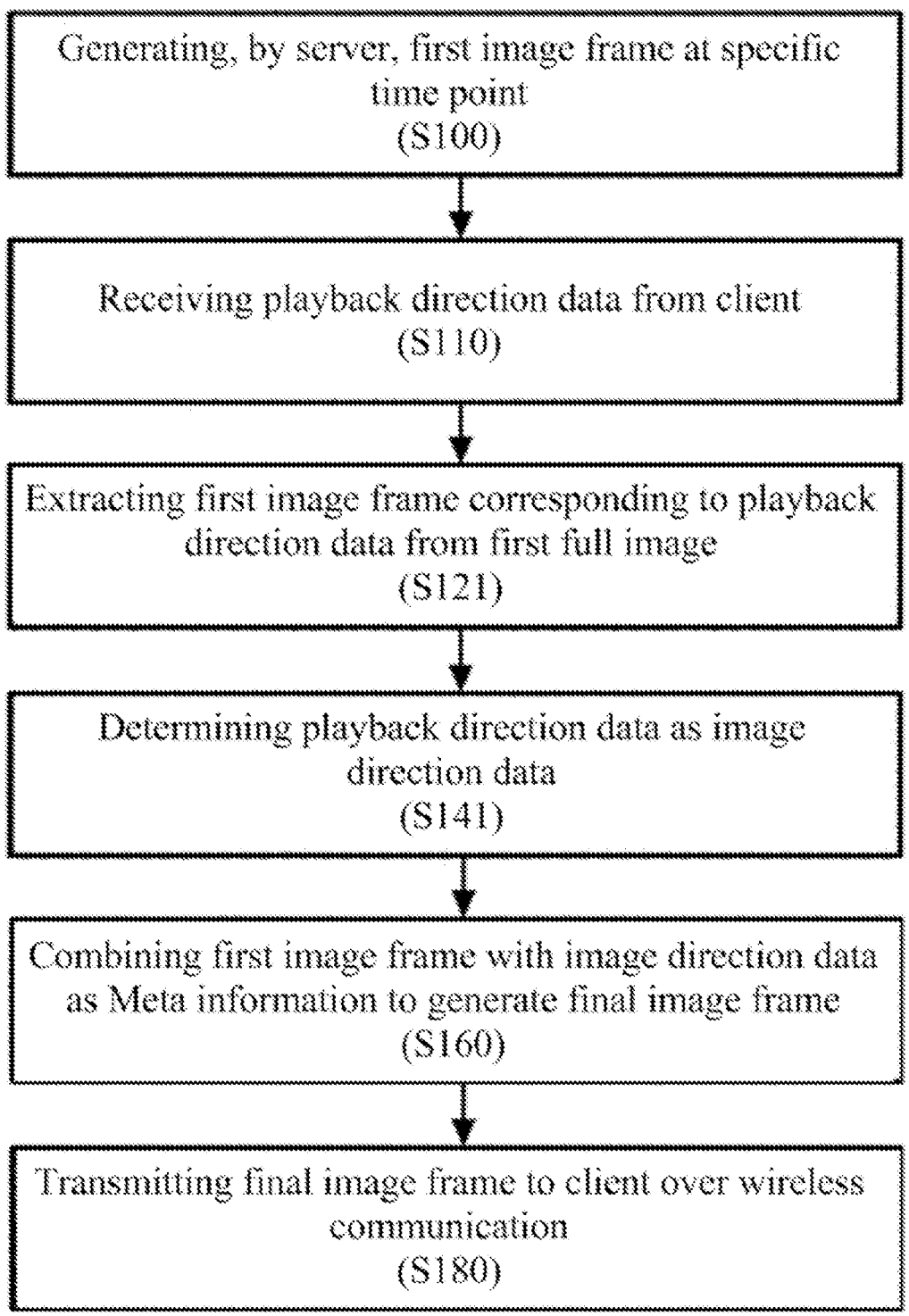
FIG. 3 is a flowchart of a method of transmitting a VR image frame generated based on a first full image, according to an embodiment of the inventive concept.

FIG. 3 is a flowchart of a method of transmitting a VR image frame generated based on a first full image, according to an embodiment of the inventive concept.

The VR image transmitting method according to another embodiment of the inventive concept may include operation S100 in which the server 100 generates a first full image at a specific time point, operation S110 of receiving playback direction data from the client 200, operation S121 of extracting a first image frame corresponding to the playback direction data from the first full image, operation S141 of determining the playback direction data as image direction data, operation S160 of combining the first image frame with the image direction data as Meta information to generate a final image frame, and operation S180 of transmitting the final image frame to the client 200 over network communication. Hereinafter, a detailed description about the above-mentioned operation will be omitted.

In operation S100, the server 100 obtains a first full image at a specific time point. The first full image may mean an image including an image frame in all directions that the user's gaze faces. That is, the server 100 may drive a specific internal program to generate a full image at a specific time point, and may extract a full image at a specific time point from the previously generated full image (e.g., an image captured by a 360-degree camera during a constant time) at a constant time.

In operation S110, the server 100 receives playback direction data from the client 200.

In operation S121, the server 100 extracts a first image frame corresponding to the playback direction data, from the first full image. That is, the server 100 may determine the direction in which the image frame is requested, through the playback direction data received from the client 200, and may extract the first image frame corresponding to the playback direction data from the first full image.

In operation S141, the server 100 determines the playback direction data as the image direction data. That is, since the extracted first image frame is an image frame in a direction corresponding to the playback direction data, the server 100 may set the playback direction data received from the client 200 to image direction data of the extracted first image frame.

In operation S160, the server 100 may combine the first image frame with the image direction data as Meta information to generate the final image frame. In operation S180, the server 100 transmits the final image frame to the client 200 over network communication.

Figure 4:
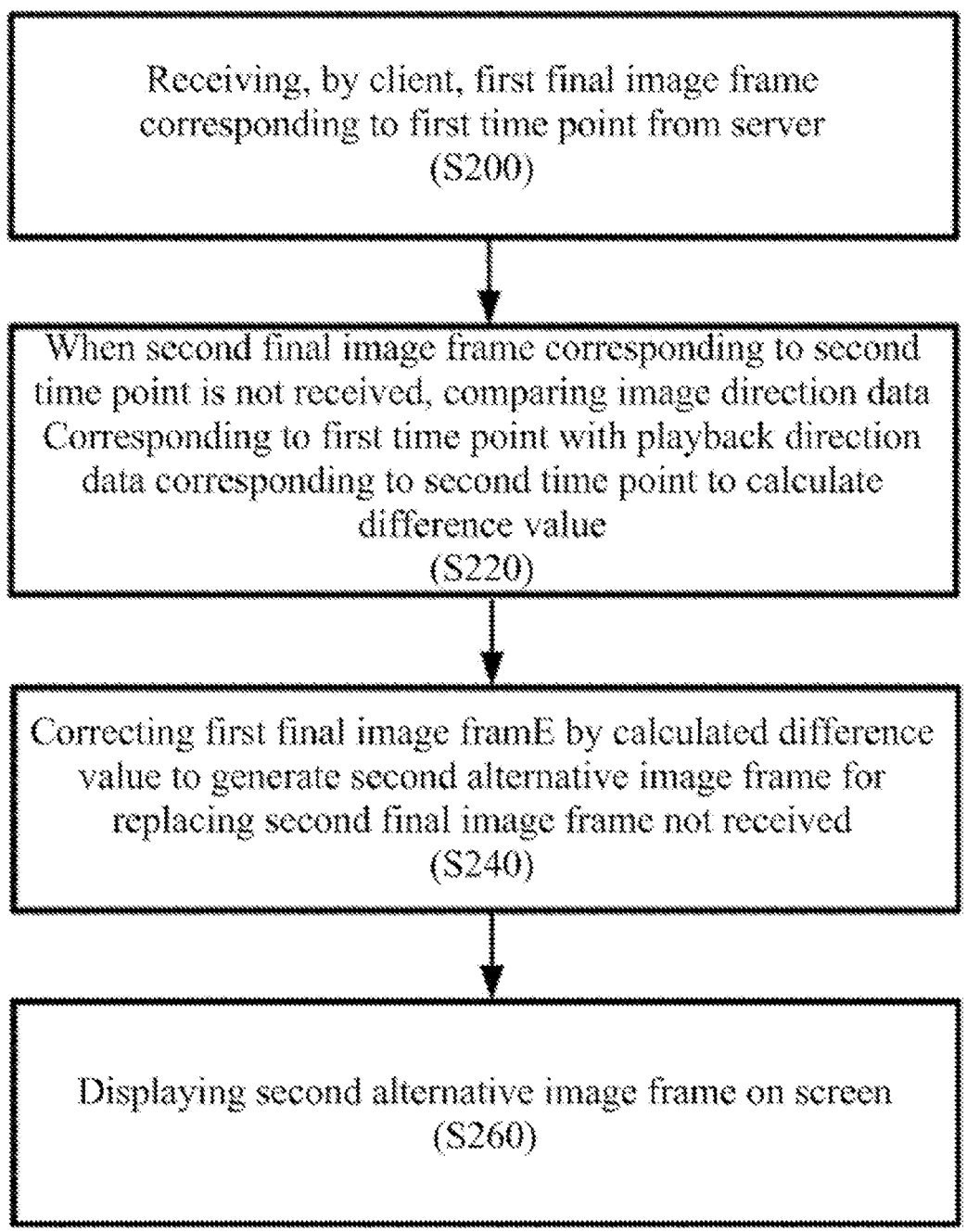
FIG. 4 is a flowchart of a VR image playing method of a client, according to an embodiment of the inventive concept.

FIG. 4 is a flowchart illustrating a VR image playing method of the client 200, according to an embodiment of the inventive concept.

The VR image playing method according to another embodiment of the inventive concept may include operation S200 in which the client 200 receives a first final image frame corresponding to a first time point from the server 100, operation S220 comparing image direction data corresponding to the first time point with playback direction data corresponding to the second time point to calculate a difference value when a second final image frame corresponding to a second time point is not received, operation S240 of correcting the first final image frame by the calculated difference value to generate a second alternative image frame for replacing the second final image frame not received, and operation S260 of displaying the second alternative image frame on a screen.

In operation S200, the client 200 receives a first final image frame corresponding to a first time point, from the server 100. That is, the client 200 may receive the first final image frame, with which image direction data is combined as Meta information, from the server 100 over network communication. The image direction data may be data associated with a direction on a three-dimensional space of the image frame obtained by the server 100, and the final image frame may be an image frame including the image direction data as Meta information by the server 100.

Figure 5:
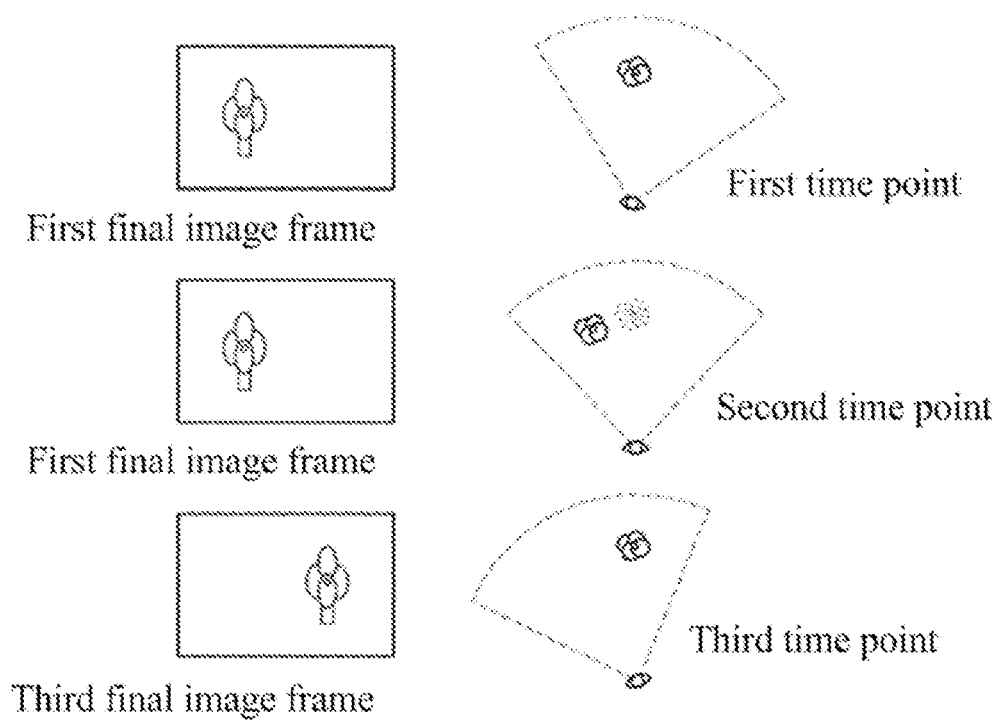
FIG. 5 is a schematic diagram illustrating a change of an image provided to a user through a client when a second final image frame is missed and a second alternative image frame is not provided.

In operation S220, when the second final image frame corresponding to the second time point is not received, the client 200 compares image direction data corresponding to the first time point with playback direction data corresponding to the second time point to calculate the difference value. The second time point may be a time point at which the transmission period of the final image frame has elapsed from the first time point. After the transmission period of the final image frame has elapsed after the client 200 receives and displays the first final image frame corresponding to the first time point, the client 200 may fail to receive the second final image frame at the second time point due to a bad communication state, or the like. In this case, as the first final image frame is continuously displayed instead of the second final image frame, which a user expects at the second time point, an object may be shaken by a difference between the playback direction data at the second time point and the image direction data of the first final image frame. That is, when a new final image frame (i.e., a third final image frame) is received at a third time point (i.e., a time point at which the transmission period of the final image frame has elapsed from the second time point) after the first final image frame corresponding to the first time point is continuously displayed at the second time point, as illustrated in FIG. 5, the location of an object corresponding to the second time point is skipped and the object location at the first time point is moved to the object location at the third time point when the first final image frame is directly changed to the third final image frame, and thus the user may feel the phenomenon that the object moves or shakes unnaturally. When the phenomenon happens continuously, the user may feel motion sickness. To solve this, the client 200 needs to generate an image frame for replacing the missing second final image frame. Accordingly, the client 200 may modify the first final image frame received at the first time point to generate the image frame at the second time point (i.e., the second alternative image frame).

The client 200 needs to determine the correction level to convert the first final image frame to an image frame matched with the second time point. To this end, the client 200 may compare the image direction data corresponding to the first time point with the playback direction data corresponding to the second time point to calculate the difference value. The playback direction data may be data associated with the direction of an image frame to be played on the screen of the client 200 at a specific point in time. The playback direction data may be measured through a sensor (e.g., a gyro sensor, a geomagnetic sensor, an acceleration sensor, or the like) included in a VR device. For example, when the client 200 receives an image frame including the image direction data corresponding to the playback direction data from the server 100 and then provides the user with the image frame, the client 200 may calculate a difference between second playback direction data corresponding to a direction, in which the image frame needs to be provided, and first image direction data corresponding to a direction of the first final image frame to calculate a value for correcting the first final image frame.

The playback direction data and the image direction data may include data of angle of elevation and azimuth data. The client 200 may calculate a difference in angle of elevation and azimuth between the playback direction data at the second time point and the image direction data at the first time point.

Furthermore, the playback direction data and the image direction data may include tilt data, which is the angle of rotation about the frontal direction of the wearer. The client 200 may calculate a difference in tilt data between the playback direction data at the second time point and the image direction data at the first time point.

In operation S240, the client 200 corrects the first final image frame by the calculated difference value to generate the second alternative image frame for replacing the second final image frame not received. According to an embodiment, the client 200 may move the first final image frame based on the difference value. That is, the client 200 may move the first final image frame in the vertical direction by the difference value of angle of elevation and may move the first final image frame in the horizontal direction by the difference value of azimuth. Moreover, the client 200 may rotate the first final image frame by the difference value of tilt data. Since an object that the user watches rotates when the user tilts his/her head in a specific direction about his/her frontal direction, the client 200 may rotate the first final image frame by the difference value of tilt data between the image direction data at the first time point and the playback direction data at the second time point.

Figure 6:
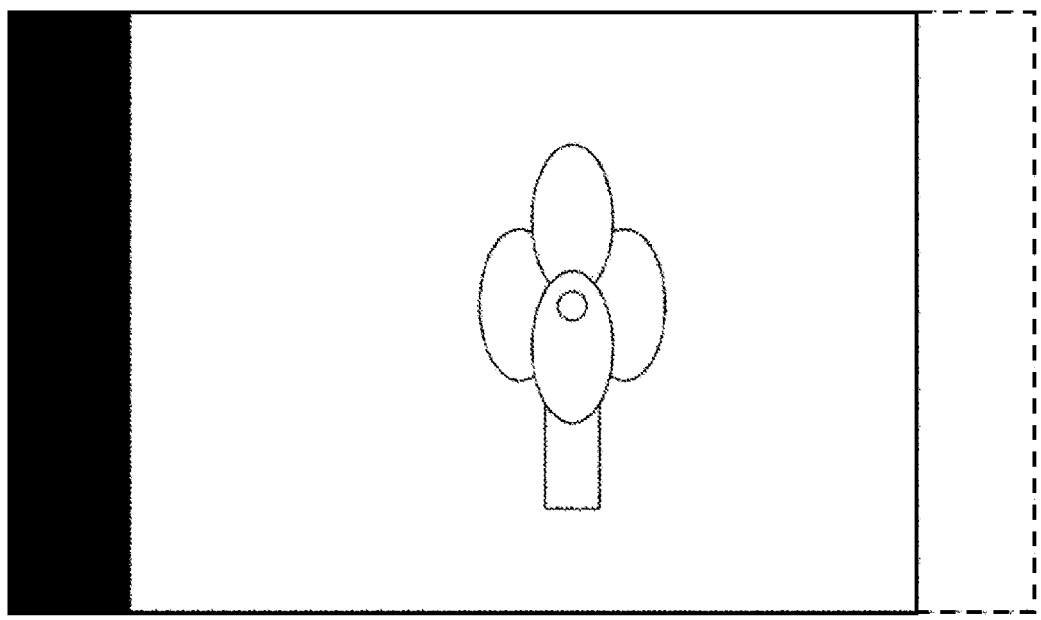
FIG. 6 is a schematic diagram illustrating a second alternative image frame generated by a client based on a difference value between image direction data at a first time point and playback direction data at a second time point, according to an embodiment of the inventive concept.

As illustrated in FIG. 6, when the client 200 corrects the first final image frame depending on the difference value, a blank area may be generated on the second alternative image frame to be provided to the user. The blank area may be processed in black and white; alternatively, the blank area may be processed as a combination of similar colors to allow the wearer to visually minimally recognize the blank area.

In operation S260, the client 200 displays the second alternative image frame on a screen. That is, the client 200 may display the second alternative image frame obtained by correcting the first final image frame, on the screen instead of the second final image frame missed at the second time point.

Figure 7:
FIG. 7 is a schematic diagram illustrating an object location change according to a case where a final image frame is sequentially provided without a missing frame when a client moves.
Figure 7:
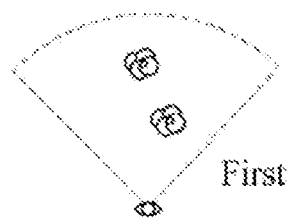
Figure 7:
Figure 7:
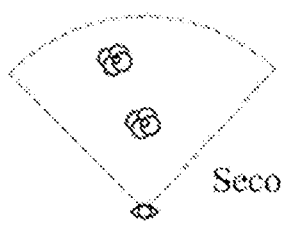
Figure 7:
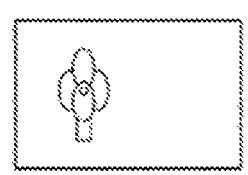
Figure 7:
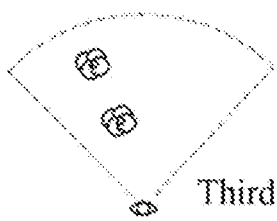
Figure 8:
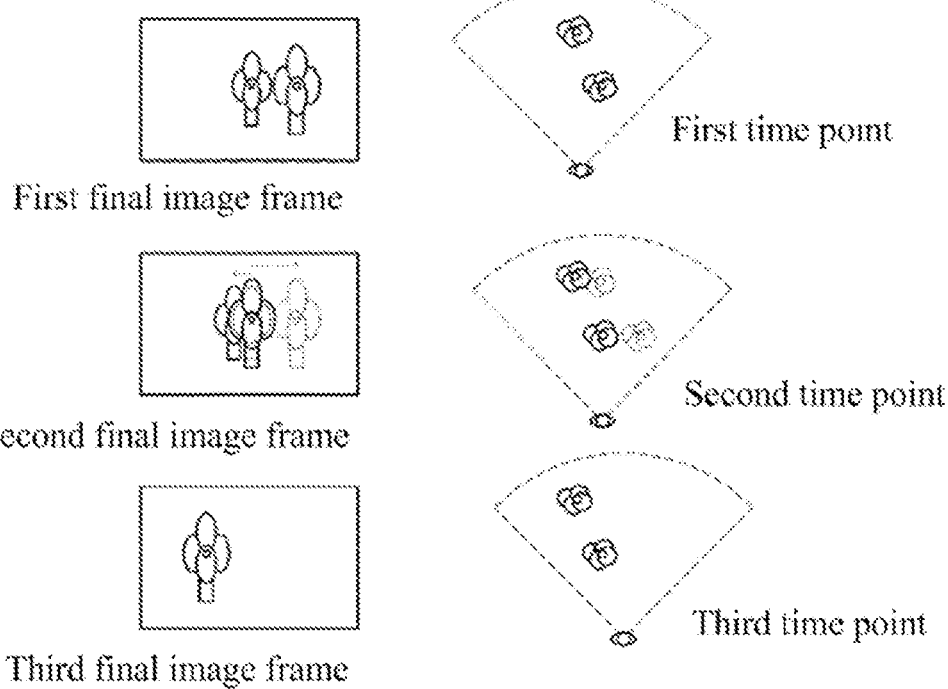
FIG. 8 is a schematic diagram in which a second alternative image frame, in which each object location is corrected in a first final image frame, is provided by reflecting the amount of movement of a client, according to an embodiment of the inventive concept.

Also, when the user moves while wearing the client 200, the client 200 may grasp the amount of the user's movement (e.g., a movement distance and movement direction, the number of steps, or the like) and may correct the first final image frame so as to be suitable for the amount of the user's movement, when the final image frame is not received at the second time point. According to an embodiment, when the user moves, objects have a difference in the degree of the location changed depending on the distance from the user. As illustrated in FIG. 7, an object located closer to the user moves by a greater width along the movement of the user; and an object located farther away from the user moves by a width smaller than the object located closer to the user, along the movement of the user. Therefore, it is necessary to reflect the difference of the object movement widths according to the distance to a VR image, thereby providing the user with high reality. To this end, the server may include distance information (hereinafter referred to as "depth information") in which each of a plurality of objects (i.e., objects expressed as the set of each pixel in an image frame) is spaced apart from the client, as Meta information and may generate and transmit the final image frame. When the second final image frame at the second time point is missed, the client may calculate the amount of the user's movement by using the included one or more sensors (e.g., a gyro sensor, an acceleration sensor, a geomagnetic sensor, and the like) and may generate the second alternative image frame by respectively reflecting pieces of depth information of the objects to the objects in the first final image frame. That is, as illustrated in FIG. 8, the client may perform correction for each pixel corresponding to the plurality of objects in the first final image frame, depending on a difference between client locations (i.e., the location of the user wearing the client) at the first time point and at the second time point and then may generate the second alternative image frame. In addition, additionally, the client may correct an object of a pixel unit by reflecting a difference in the width of object movement according to the distance at which an object is disposed, and then may compensate for an area in which the object has been disposed in the existing first final image frame. The client may fill a space, in which an existing object is disposed, with a specific color combination by reflecting the peripheral color.

Furthermore, according to another embodiment, when the movement widths of objects are different, the client may move the image frame so as to be matched with the placement location of the object of the largest size and then may adjust the remaining objects in units of pixels. As such, since a pixel unit task is not performed on the object of the largest size, an empty space generated depending on pixel unit movement in the second alternative image frame may be minimized. Moreover, according to another embodiment, when the user wearing the client moves forward or backward, the client may generate the second alternative image frame for replacing the missing second final image frame, by enlarging or reducing the first final image frame.

Also, an operation of comparing image direction data corresponding to the (n−1)-th time point with playback direction data corresponding to the n-th time point to calculate a difference value when the final image frame corresponding to the n-th time point ('n' is a natural number greater than '1') is not received, and an operation of correcting the (n−1)-th alternative image frame by the calculated difference value to generate the n-th alternative image frame may be further included. That is, when the third final image frame is received at the third time point after the second alternative image frame is provided because the second final image frame is not received at the second time point, the user may recognize that an object in an image moves smoothly. However, when an image frame is not continuously received even after the second time point, the client 200 needs to generate the next alternative image frame (e.g., the third alternative image frame or the n-th alternative image frame) based on the previously generated alternative image frame (e.g., the second alternative image frame or the (n−1)-th alternative image frame). The client 200 may compare image direction data (or playback direction data measured at the (n−1)-th time point) in the (n−1)-th alternative image frame at the (n−1)-th time point with the playback direction data measured at the n-th time point to calculate a difference value and then may correct (e.g., move or convert) the (n−1)-th alternative image frame by the calculated difference value to generate the n-th alternative image frame. As such, even in the case where the final image frame is not continuously received from the server due to a bad communication state, the client 200 may provide the user with the natural VR image.

Hereinafter, an embodiment in which the client 200 plays a VR image by using one or more layers will be described in detail.

Figure 9:
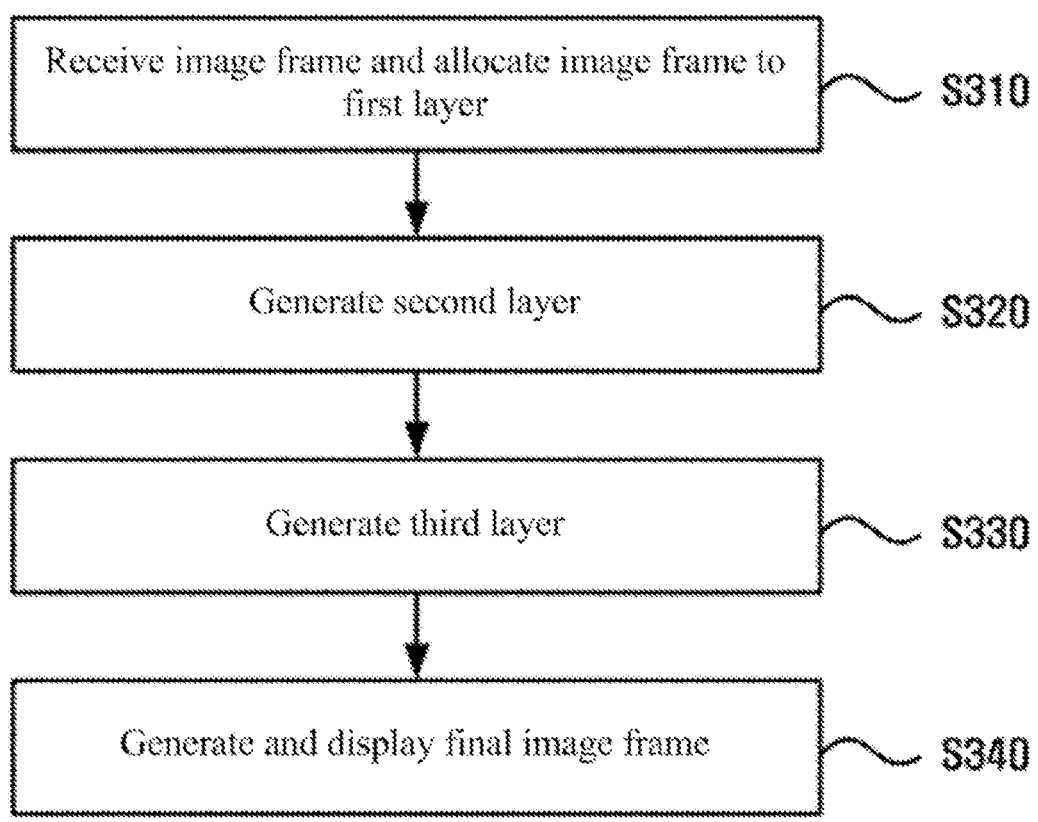
FIG. 9 is a flowchart illustrating a method of playing a VR image by using one or more layers, according to an embodiment.

FIG. 9 is a flowchart illustrating a method of playing a VR image by using one or more layers, according to an embodiment.

In operation S310, the client 200 receives an image frame from the server 100, and the client 200 allocates the received image frame to a first layer.

In operation S320, the client 200 generates a second layer including at least one graphic user interface (GUI).

In operation S330, the client 200 generates a third layer for displaying control information of at least one controller.

In operation S340, the client 200 generates a final image frame and displays the generated final image frame.

According to an embodiment, the client 200 composes the first layer and the second layer to generate the final image frame and displays the generated final image frame.

According to another embodiment, the client 200 composes the first layer, the second layer, and the third layer to generate a final image frame and displays the generated final image frame.

Figure 10:
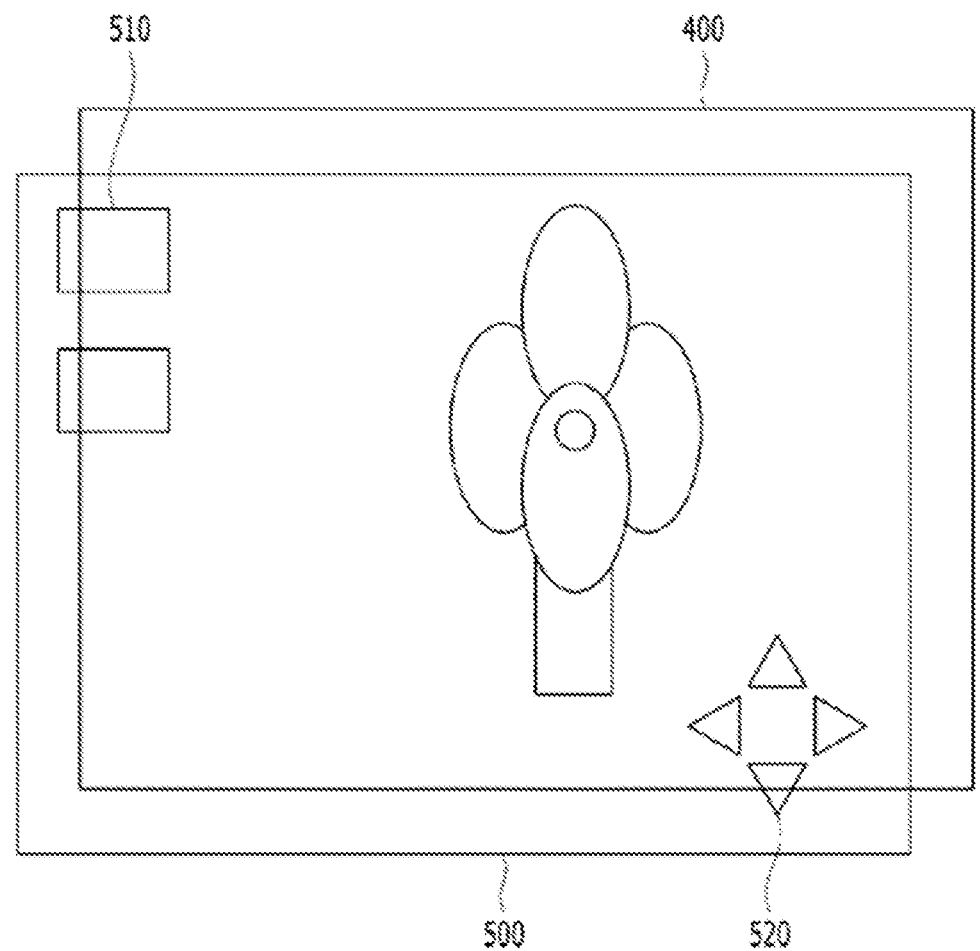
FIG. 10 is a view illustrating a method of playing a VR image including a first layer and a second layer, according to an embodiment.

FIG. 10 is a view illustrating a method of playing a VR image including a first layer and a second layer, according to an embodiment.

Referring to FIG. 10, a first layer 400 on which an image frame received from a server is displayed, and a second layer 500, on which at least one or more GUIs 510 and 520 are displayed, are displayed.

The image frame displayed on the first layer 400 is changed at the transmission period at which the image frame is transmitted from the server 100.

The at least one or more GUIs 510 and 520 displayed on the second layer 500 control the client 200 or an application corresponding to an image displayed in the client 200 or are used to display information corresponding to the image displayed in the client 200.

For example, the at least one or more GUIs 510 and 520 may control the playback of the image displayed in the client 200 or may include at least one user interface for displaying information corresponding to the image.

For another example, the at least one or more GUIs 510 and 520 may include at least one user interface for displaying information corresponding to the manipulation of a game displayed in the client 200 or the game.

When the client 200 moves along a user's movement, the image frame displayed on the first layer 400 is changed to an image frame corresponding to playback direction data and image direction data determined depending on the location or direction of the client 200. However, the location of the GUI displayed on the second layer 500 may not be changed and may be moved along with the user's gaze.

Likewise, according to an embodiment, when an image frame at the first time point is displayed on the first layer 400 and the image frame at the second time point at which the transmission period of an image frame elapses from the first time point is not received, the client 200 calculates a difference value between the image direction data at the first time point with playback direction data at the second time point, and then corrects the first image frame based on the difference value to generate the second alternative image frame.

In the case where an image frame and a GUI are displayed together on one layer, when the first image frame is corrected depending on the embodiment, the GUI displayed on the first image frame may also move or rotate together, and thus the user may feel uncomfortable.

Accordingly, according to the embodiment illustrated in FIG. 10, the image frame may be allocated to the first layer 400 and the GUIs 510 and 520 may be allocated to the second layer 500, thereby eliminating the inconvenience caused by the correction of the image frame.

In particular, the client 200 allocates and displays the generated second alternative image frame to the first layer 400.

On the other hand, the second layer 500 is generated by the client 200, and thus there is no delay or omission. Also, since the locations of the GUIs 510 and 520 displayed on the second layer 500 are not changed in the frame, there is no need to correct the frame displayed on the second layer 500.

Accordingly, the client 200 composes the first layer 400 including the second alternative image frame, the correction of which is completed, and the second layer 500, the correction of which is not performed, to generate the final image frame, and then displays the generated final image frame.

The client 200 may receive information for generating the GUIs 510 and 520 displayed on the second layer 500 from the server 100 or may directly obtain the information.

Even in the case where information is received from the server 100 to generate the GUIs 510 and 520, the amount of information necessary to generate the GUIs 510 and 520 is much smaller than the amount of information included in the image frame displayed on the first layer 400. Furthermore, unlike the image frame displayed on the first layer 400, since the GUIs 510 and 520 may not instantly change depending on to the movement or the client 200 or as time goes on, the image may be easily corrected by dividing the image into the first layer 400 and the second layer 500 to process the first layer 400 and the second layer 500 and the GUI may be also corrected in a process of correcting the image frame according to the disclosed embodiment, thereby preventing the user from being inconvenient.

Figure 11:
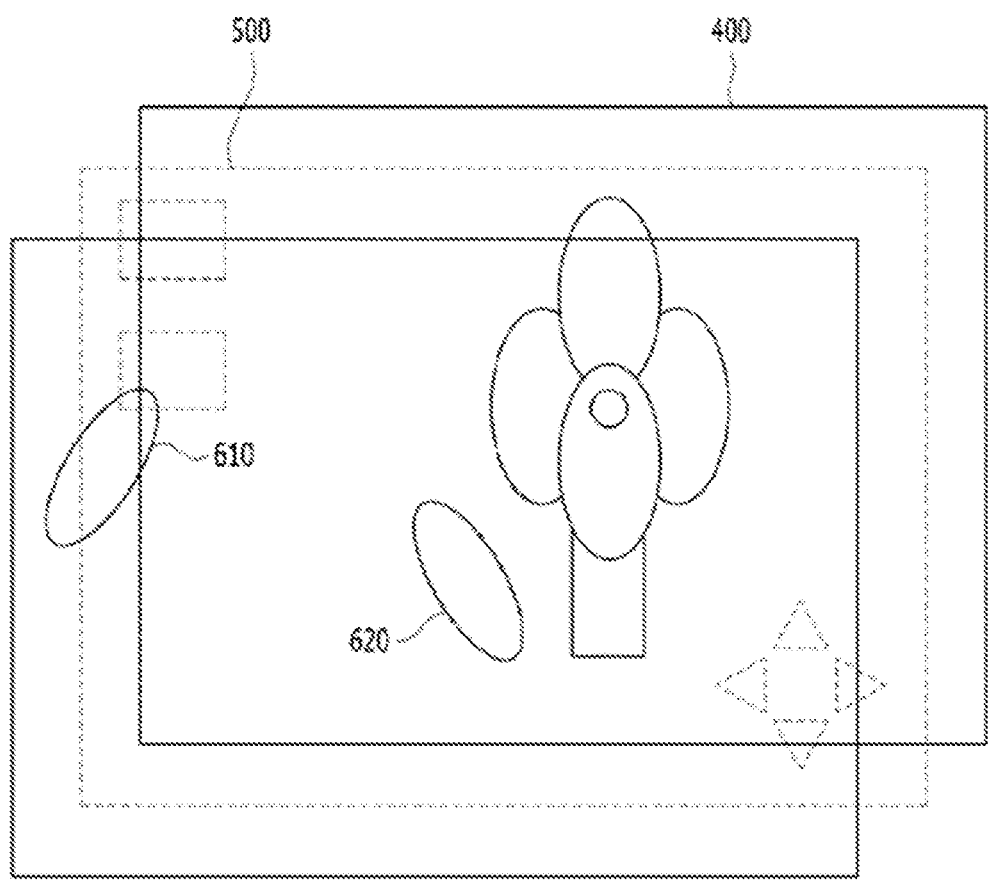
FIG. 11 is a view illustrating a method of playing a VR image including a first layer, a second layer, and a third layer, according to an embodiment.

FIG. 11 is a view illustrating a method of playing a VR image including a first layer, a second layer, and a third layer, according to an embodiment.

FIG. 11 is a view illustrating an embodiment in which a third layer 600 is added, in the embodiment illustrated in FIG. 10. Accordingly, the description in FIG. 10 applies to the first layer 400 and the second layer 500 illustrated in FIG. 11 even in the case of the content omitted with regard to the first layer 400 and the second layer 500.

According to an embodiment, the client 200 is connected to one or more controllers (not illustrated). The controller is used to control a VR image or to control an application or a game corresponding to the VR image.

The client 200 receives operation information of a controller and generates an image indicating control information of at least one controller by using the received operation information.

The client 200 allocates the image indicating the control information of the controller to the third frame 600.

Referring to FIG. 11, the third frame 600 displays controller images 610 and 620 indicating at least one of location information, direction information, and operation information of the at least one controller.

The client 200 obtains at least one of the location information, the direction information, and the operation information of the at least one controller and generates an image indicating control information of the controller by using the obtained information. The client 200 displays one frame of the generated image on the third layer 600.

Since information displayed on the third layer 600 is received from the controller and displayed by the client 200, the client 200 obtains or generates and displays the information regardless of the state of communication with the server 100.

The client 200 may display control information of the controller without the latency occurring during communication with the server 100.

Accordingly, like the second layer 500, there is no need to correct a frame with respect to the third layer 600.

The client 200 corrects only the image frame displayed on the first layer 400, allocates the second alternative image frame generated through the correction to the first layer 400, and composes the first layer 400, the second layer 500, and the third layer 600 to generate the final image frame.

The client 200 displays the generated final image frame.

As described above, according to an embodiment of the inventive concept, the VR image transmitting method, the VR image playing method, and the VR image correcting method may be implemented with a program (or application) to be executed in combination with the server 100 or the client 200, which is hardware, and may be stored in the media.

The above-described program may include a code encoded by using a computer language such as C, C++, JAVA, a machine language, or the like, which a processor (CPU) of the computer can read through the device interface of the computer, such that the computer reads the program and performs the methods implemented with the program. The code may include a functional codes associated with the function that defines functions necessary to perform the methods, and may include a control code associated with an execution procedure necessary for the processor of the computer to perform the functions in a predetermined procedure. Furthermore, the code may further include additional information necessary for the processor of the computer to perform the functions or a memory reference-related code associated with the location (address) of the internal or external memory of the computer, at which the media needs to be checked. Moreover, when the processor of the computer needs to communicate with any other remote computer or any other remote server to perform the functions, the code may further include a communication-related code associated with how to communicate with any other remote computer or server using the communication module of the computer, what information or media should be transmitted or received during communication, or the like.

The stored media may mean the media that does not store data for a short period of time such as a register, a cache, a memory, or the like but semi-permanently stores to be read by the device. Specifically, for example, the stored media include, but are not limited to, ROM, RAM, CD-ROM, magnetic tape, floppy disk, optical data storage device, and the like. That is, the program may be stored in various recording media on various servers that the computer can access, or various recording media on the computer of the user. In addition, the media may be distributed to a computer system connected to a network, and a computer-readable code may be stored in a distribution manner.

According to an embodiment of the inventive concept, it has various effects as follows.

First, since the missing image frame at a specific time point at which a VR image frame is transmitted wirelessly may be supplemented, the entire viewpoint of the VR space may not be shaken and may be maintained naturally, even in the case where a specific image frame is not received.

Second, a user may enjoy seamless VR images anywhere by using cellular communication or WLAN communication even while a server computer is far away from the user.

Third, since the case that an image frame is not received is capable of being supplemented, the VR image may be transmitted wirelessly and the problem that an action is limited due to a cable connected to a computer and the cable gets into a safety accident may be solved.

Fourth, the server extracts only one frame in the full image matched with the playback direction data requested by a client or generates and transmits only the frame in the direction matched with the playback direction data, thereby saving the network bandwidth of wireless communication.

Fifth, only one frame is transmitted instead of transmitting the full image in all directions with the same data capacity, and thus it is possible to transmit a high-resolution image without occupying a large amount of communication traffic. As such, the user wearing the client may watch the high-resolution image at a long distance.

Sixth, the client receives only the image frame in the direction requiring playback from the server, and thus there is no need for a procedure in which the client extracts a frame in the direction to be played, in the full image, for the purpose of playing the frame in the desired direction. As such, the client may not need high specification.

The effects of the present inventive concept are not limited to the aforementioned effects, and other effects not mentioned herein will be clearly understood from the following description by those skilled in the art to which the inventive concept pertains.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of playing a virtual reality image, the method comprising:
  receiving, by a client, an image frame from a server, wherein the receiving of the image frame includes: receiving, by the client, a first image frame corresponding to a first time point from the server;
  allocating the received image frame to a first layer;
  generating a second layer including at least one graphic user interface;
  composing the first layer and the second layer to generate a final image frame;
  displaying the generated final image frame; and
  obtaining playback direction data and image direction data, which correspond to the first time point,
  wherein the playback direction data is data associated with a direction of the image frame to be played on a screen of the client at a specific time point, and
  wherein the image direction data is data associated with a direction on a three-dimensional space of the image frame generated by the server.

2. The method of claim 1, further comprising:
  generating a third layer for displaying control information of at least one controller,
  wherein the generating of the final image frame includes:
  composing the first layer, the second layer, and the third layer to generate the final image frame.

3. The method of claim 2, wherein the generating of the third layer frame includes:
  receiving, by the client, operation information of the at least one controller;
  generating an image indicating the control information of the at least one controller, by using the received operation information; and
  allocating the generated image to the third layer.

4. The method of claim 1, wherein the obtaining of the playback direction data includes:
  measuring movement of a user's head to obtain the playback direction data.

5. The method of claim 1, wherein the receiving of the image frame further includes:
  when an image frame at a second time point is not received, calculating a difference value between the image direction data at the first time point and the playback direction data at the second time point to correct the first image frame based on the difference value, and
  wherein the second time point is a time point at which a transmission period of the image frame elapses from the first time point.

6. The method of claim 5, wherein the correcting of the first image frame includes:
  moving or converting the first image frame based on the difference value to generate a second alternative image frame, and
  wherein the allocating of the received image frame to the first layer includes:
  allocating the generated second alternative image frame to the first layer.

7. The method of claim 5, wherein the playback direction data and the image direction data include data of angle of elevation and azimuth data, and
  wherein the calculating of the difference value includes:
  calculating a difference in angle of elevation and azimuth between the image direction data at the first time point and the playback direction data at the second time point.

8. The method of claim 5, wherein the playback direction data and the image direction data include tilt data, which is an angle of rotation about a frontal direction of a user, and
  wherein the correcting of the first image frame further includes:
  rotating and correcting the first image frame based on a difference in the tilt data between the playback direction data at the second time point and the image direction data at the first time point.

9. The method of claim 5, further comprising:
comparing the image direction data corresponding to a (n−1)-th time point with the playback direction data corresponding to a n-th time point to calculate the difference value, when the image frame corresponding to the n-th time point ('n' is a natural number greater than '2') is not received; and
correcting a (n−1)-th alternative image frame by the calculated difference value to generate a n-th alternative image frame,
wherein the n-th time point is a time point at which the transmission period of the image frame elapses from the (n−1)-th time point, as a time point at which a n-th image frame is received.

10. A non-transitory computer-readable recording medium storing a virtual reality image playing program, and configured to be coupled to a computer being hardware, the program includes instructions to execute the method of claim 1.

* * * * *